United States Patent [19]
Lettmann et al.

[11] Patent Number: 6,025,031
[45] Date of Patent: Feb. 15, 2000

[54] COATING AGENT CONSISTING OF AT LEAST 3 COMPONENTS

[75] Inventors: Bernhard Lettmann, Drensteinfurt; Heinz-Peter Rink; Bernd Mayer, both of Münster; Egbert Nienhaus, Ascheberg, all of Germany; Sunitha Grandhee, Novi, Mich.

[73] Assignee: BASF Coatings AG, Muenster-Hiltrup, Germany

[21] Appl. No.: 09/180,083

[22] PCT Filed: Apr. 22, 1997

[86] PCT No.: PCT/EP97/02024

§ 371 Date: Dec. 11, 1998

§ 102(e) Date: Dec. 11, 1998

[87] PCT Pub. No.: WO97/42247

PCT Pub. Date: Nov. 13, 1997

[30] Foreign Application Priority Data

May 8, 1996 [DE] Germany ............................. 196 18 446

[51] Int. Cl.⁷ ................. B05D 7/14; C08G 18/62
[52] U.S. Cl. .................... 427/388.4; 427/393.5; 427/409; 427/412.1
[58] Field of Search ............... 427/388.4, 393.5, 427/409, 412.1

[56] References Cited

FOREIGN PATENT DOCUMENTS

| | | |
|---|---|---|
| 0 089 497 | 2/1983 | European Pat. Off. . |
| 0 358 979 B1 | 8/1989 | European Pat. Off. . |
| WO 92/22612 | 12/1992 | European Pat. Off. . |
| WO 95/35348 | 12/1995 | European Pat. Off. . |
| 44 21 823 A1 | 6/1994 | Germany . |
| 195 42 626 A1 | 11/1995 | Germany . |

*Primary Examiner*—Erma Cameron

[57] ABSTRACT

The present invention relates to a coating composition consisting of at least three components (I), (II) and (III), component (I) containing as binder (A) at least one acrylate copolymer (A1) which is dispersed or dissolved in organic, optionally water-dilutable solvent and/or one polyester resin (A2) which is dispersed or dissolved in organic, optionally water-dilutable solvent and/or one polyurethane resin (A3) which is dispersed or dissolved in organic, optionally water-dilutable solvent and/or optionally a further binder (A4), component (II) contains at least one nonblocked polyisocyanate as crosslinking agent, and component (III) contains as constituent essential to the invention an aqueous dispersion, prepared in a single- or multistage method, of a hydrophilicized polymer resin HP based on a hydrophobic polymer resin HP' and also, if desired, contains components (A1) and/or (A2) and/or (A3) and/or (A4) in aqueous dispersion.

Also described is the use of the novel coating compositions for the finishing of automobile bodies and plastics parts and for automotive refinishing.

12 Claims, No Drawings

COATING AGENT CONSISTING OF AT LEAST 3 COMPONENTS

This application is the national stage of International Application No. PCT/EP97/02024, filed Apr. 22, 1997.

FIELD OF THE INVENTION

The present invention relates to a coating composition consisting of at least three components (I), (II) and (III) which is based on a polymer which contains hydroxyl and acid groups and is dispersed or dissolved in one or more organic, optionally water-dilutable solvents, on one or more isocyanato-containing crosslinking agents and on one or more dispersions of polymers which contain hydroxyl and acid groups, including as constituent essential to the invention at least one aqueous dispersion, prepared in accordance with a specific method, of a hydrophilicized polymer resin HP.

The present invention additionally relates to a process for the preparation of these coating compositions and to the use of the coating compositions in repair coating (refinishing) and for the coating of plastics, and also as topcoat or filler.

BACKGROUND OF THE INVENTION

For ecological and economic reasons the paint industry is attempting to replace as large as possible a portion of the organic solvents employed in paints by water. In the context of automotive finishing in particular, there is a great requirement for aqueous coating materials. This applies both to the area of production-line automotive finishing and to the area of automotive refinishing.

EP-B-0 358 979 discloses aqueous two-component polyurethane coating compositions which comprise a hydroxyl-containing polyacrylate resin dispersed in water, and a polyisocyanate component. These coating materials described in EP-B-0 358 979, however, exhibit great disadvantages in respect of gloss, relaxation (low graininess of the coating), boil-mark tendency and, resulting therefrom, spray safety, and in respect of weathering resistance, especially in respect of resistance under constant condensation conditions (40 degrees C., 240 hours), processibility (drop in viscosity and inadequate pot life) and hardness.

The object of providing an aqueous coating composition which has improved properties and/or which gives improved coating films relative to the aqueous two-component polyurethane coating compositions known from EP-B-0 358 979 is largely achieved by the as yet unpublished German Patent Application P 44 21 823.0. Nevertheless, even using the 3-component systems in accordance with the as yet unpublished German Patent Application P 44 21 823.0 as automotive refinishes, there are still problems on the fully cured coatings as a result of boil marks, grey haze and/or textured surfaces, caused by poor leveling of the coating compositions.

The object which results from this, namely to provide coating systems for automotive refinishing which under the conditions of automotive refinishing lead to coatings which exhibit no surface problems, such as boil marks or textures, and no impairment of the optical quality, such as grey haze, is achieved by the 3-component coating composition described in the as yet unpublished German Patent Application P 195 42 626.

These 3-component coating compositions are characterized in that

1.) component (I) contains as binder (A)
   (A1) at least one acrylate copolymer (A1) which is dispersed or dissolved in one or more organic, optionally water-dilutable solvents and contains hydroxyl groups and acid groups which can be converted into the corresponding acid anion groups, and/or
   (A2) at least one polyester resin (A2) which is dispersed or dissolved in one or more organic, optionally water-dilutable solvents and contains hydroxyl groups and acid groups which can be converted into the corresponding acid anion groups, and/or
   (A3) at least one polyurathane resin (A3) which is dispersed or dissolved in one or more organic, optionally water-dilutable solvents and contains hydroxyl groups and acid groups which can be converted into the corresponding acid anion groups, and/or
   (A4) optionally at least one further binder,
   the binders (A1) and/or (A2) and/or (A3) and/or (A4) being selected such that a 50% strength solution of the binder (A) in ethoxyethyl propionate has a viscosity of <=6.0 dPa.s at 23° C., 2.) component (II) contains as crosslinking agent (F) at least one di- and/or polyisocyanate (F1) which is optionally dispersed or dissolved in one or more organic solvents, and/or optionally at least one further crosslinking agent, consisting of at least one epoxide compound (F2) having at least two epoxide groups per molecule and/or optionally at least one amino resin (F3), and 3.) component (III) comprises components (A1) and/or (A2) and/or (A3) and/or (A4) in aqueous dispersion.

The coating compositions described in the as yet unpublished German Patent Application P 195 42 626.6 achieve the objects addressed at the outset outstandingly.

However, there continues to be a need for aqueous coating compositions having improved water resistance, especially toward condensation, and, in particular, having an improved, i.e. accelerated, drying behavior.

SUMMARY OF THE INVENTION

The object of the present invention, therefore, was in particular to improve further the drying behavior of the aqueous coating compositions while at the same time retaining the outstanding properties known from the as yet unpublished P 195 42 626.6, such as, in particular, improved gloss, good fullness, low boil-mark tendency, better spray safety and improved leveling, and also good weathering resistance.

Surprisingly, this object is achieved by coating compositions in accordance with the as yet unpublished Patent Application P 195 42 626.6 if component (III) of the coating compositions described in P 195 42 626.6 includes, as constituent essential to the invention, at least one aqueous dispersion of a hydrophilicized polymer resin HP which has been prepared by a single- or multistage method in which in deionized water, a preemulsion PE comprising microparticles consisting of a hydrophobic polymer resin HP' and the monomeric constituents (aa1) an essentially carboxyl-free (meth)acrylic ester which is different from (aa2), (aa3) and (aa4) and is copolymerizable with (aa2), (aa3) and (aa4), or a mixture of such monomers, (aa2) an ethylenically unsaturated monomer which is copolymerizable with (aa1), (aa3) and (aa4), carries at least one hydroxyl group per molecule and is essentially free from carboxyl groups, (aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and (aa4) an ethylenically unsaturated monomer which carries at least one carboxyl group per molecule and is copolymerizable with (aa1), (aa2) and (aa3), or a mixture of such monomers, is prepared by subjecting the aqueous dispersion of the hydrophobic polymer resin HP' and the aqueous emulsion of the monomeric constituents to high shear and subsequently the polymerizable constituents of the preemulsion PE are polymerized.

In another embodiment of the invention, the hydrophilicized polymer resin is prepared by a method in which I. in deionized water, a preemulsion PE comprising microparticles consisting of the hydrophobic polymer resin HP' and the monomeric constituents (aa1) in essentially carboxyl-free (meth)acrylic ester which is different from (aa2) and (aa3) and is copolymerizable with (aa2) and (aa3), or a mixture of such monomers, (aa2) an ethylenically unsaturated monomer which is copolymerizable with (aa1) and (aa3), carries at least one hydroxyl group per molecule and is essentially free from carboxyl groups, and (aa3) optionally an ethylenically unsaturated monomer which is copolymerizable with (aa1) and (aa2), is different from (aa1) and (aa2) and is essentially free from carboxyl groups, or a mixture of such monomers, is prepared by subjecting the aqueous dispersion of the hydrophobic polymer resin HP' and the aqueous emulsion of the monomeric constituents to high shear and subsequently the polymerization of the polymerizable constituents of the preemulsion PE is begun, and then II. during and/or after the conclusion, but not simultaneously with the commencement, of the polymerization of the polymerizable constituents of the preemulsion PE, a monomer mixture comprising (aa1) an essentially carboxyl-free (meth)acrylic ester which is different from (aa2), (aa3) and (aa4) and is copolymerizable with (aa2), (aa3) and (aa4), or a mixture of such monomers, (aa2) an ethylenically unsaturated monomer which is copolymerizable with (aa1), (aa3) and (aa4), carries at least one hydroxyl group per molecule and is essentially free from carboxyl groups, (aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and (aa4) an ethylenically unsaturated monomer which carries at least one carboxyl group per molecule and is copolymerizable with (aa1), (aa2) and (aa3), or a mixture of such monomers is added in a feed stream and then polymerized.

In another preferred embodiment of the invention, the hydrophobic polymer HP' contains polymerizable double bonds whose number is on average preferably from 0.05 to 1.1, particularly preferably from 0.2 to 0.9 and, with very particular preference, from 0.3 to 0.7 per polymer molecule.

Furthermore, preferred hydrophobic polymer resins HP' are polyurethane resins.

In a particularly preferred embodiment of the invention, the polyurethane resin employed is composed of:

(b1) a polyester or polyether polyol which optionally contains polymerizable double bonds and has a number-average molecular weight Mn of from 400 to 5000 daltons, or a mixture of such polyether and polyester polyols, (b2) a di- and/or polyisocyanate or a mixture of di- and/or polyisocyanates, (b3) optionally a compound which has in the molecule at least one group which is reactive toward isocyanate groups and at least one group which is capable of forming anions, or a mixture of such compounds, (b4) optionally a compound which in addition to a polymerizable double bond also contains at least one group which is reactive toward isocyanate groups, or a mixture of such compounds (b5) optionally a compound which has in the molecule a group which is reactive toward isocyanate groups and at least one polyoxyalkylene group, or a mixture of such compounds, and (b6) optionally at least one hydroxyl- and/or amino-containing organic compound having a molecular weight of from 60 to 600 daltons, or a mixture of such compounds.

In comparison to the coating compositions of the as yet unpublished Patent Application P 195 42 626.6, the novel coating compositions are distinguished by an improved drying behavior coupled with equally good gloss, good fullness, low boil-mark tendency, by an improved spray safety.

DETAILED DESCRIPTION OF THE INVENTION

Components (I) and (II) of the novel coating composition in accordance with the as yet unpublished Patent Application P 195 42 626.6

Component (I)

Component (I) of the novel coating composition contains as binder (A)

(A1) at least one acrylate copolymer (A1) which is dispersed or dissolved in one or more organic, optionally water-dilutable solvents, contains hydroxyl groups and acid groups which can be converted into the corresponding acid anion groups and preferably has a number-average molecular weight Mn of between 1,000 and 30,000 daltons, an OH number of from 40 to 200 mg of KOH/g and an acid number of from 5 to 150 mg of KOH/g, and/or (A2) at least one polyester resin (A2) which is dispersed or dissolved in one or more organic, optionally water-dilutable solvents, contains hydroxyl groups and acid groups which can be converted into the corresponding acid anion groups and preferably has a number-average molecular weight Mn of between 1,000 and 30,000 daltons, an OH number of from 30 to 250 mg of KOH/g and an acid number of from 5 to 150 mg of KOH/g, and/or (A3) at least one polyurethane resin (A3) which is dispersed or dissolved in one or more organic, optionally water-dilutable solvents, contains hydroxyl groups and acid groups which can be converted into the corresponding acid anion groups and preferably has a number-average molecular weight Mn of between 1,000 and 30,000 daltons, an OH number of from 20 to 200 mg of KOH/g and an acid number of from 5 to 150 mg of KOH/g, and/or (A4) optionally a further binder.

Suitable acrylate copolymers (A1) containing hydroxyl groups and acid groups are all acrylate copolymers, preferably having the indicated OH numbers, acid numbers and molecular weights. It is preferred to employ acrylate copolymers which, as a 50% strength solution in ethoxyethyl propionate, have a viscosity of <=6.0 dPa.s at 23 degrees C.

As component (A1) it is preferred to employ the acrylate copolymers described in P 195 42 626.6, which are obtainable by polymerization, in an organic solvent or a solvent mixture and in the presence of at least one polymerization initiator, of a1) an essentially acid group-free (meth)acrylic ester which is different from (a2), (a3), (a4), (a5) and (a6) and is copolymerizable with (a2), (a3), (a4), (a5) and (a6), or a mixture of such monomers, a2) an ethylenically unsaturated monomer which carries at least one hydroxyl group per molecule and is essentially free from acid groups, is copolymerizable with (a1), (a3), (a4), (a5) and (a6) and is different from (a5), or a mixture of such monomers, 3) an ethylenically unsaturated monomer which carries at least one acid group, which can be converted into the corresponding acid anion group, per molecule and is copolymerizable with (a1), (a2), (a4), (a5) and (a6), or a mixture of such monomers, and a4) optionally one or more vinyl esters of alpha-branched monocarboxylic acids having 5 to 18 carbon atoms per molecule, and/or a5) optionally at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which is then reacted, during or after the polymerization reaction, with the glycidyl ester of an alpha-branched monocarboxylic acid having 5 to 18 carbon atoms per molecule, and a6) optionally an ethylenically unsaturated monomer which is copolymerizable with (a1), (a2), (a3), (a4), and (a5), is different from (a1), (a2), (a4) and (a5) and is essentially free from acid groups, or a mixture of such monomers, (a1), (a2), (a3), (a4), (a5) and (a6) being selected in nature and quantity such that the polyacrylate resin (A1) has the desired OH number, acid number and the desired molecular weight.

Regarding the preparation of the polyacrylate resins employed in accordance with the invention and regarding the selection of the monomer components (a1) to (a6), reference is made to the as yet unpublished German Patent Application P 195 42 626.6.

Acrylate resins which are employed with particular preference are obtained by polymerization of (a1) from 20 to 60% by weight, preferably from 30 to 50% by weight, of component (a1), (a2) from 10 to 40% by weight, preferably from 15 to 35% by weight, of component (a2), (a3) from 1 to 15% by weight, preferably from 2 to 8% by weight, of component (a3), (a4) from 0 to 25% by weight, preferably from 0 to 15% by weight, of component (a4), (a5) from 0 to 25% by weight, preferably from 0 to 15% by weight, of component (a5), and (a6) from 5 to 30% by weight, preferably from 10 to 20% by weight, of component (a6), the sum of the proportions by weight of components (a1) to (a6) being in each case 100% by weight.

The polyacrylate resin (A1) is preferably prepared in accordance with a two-stage method which is described in the as yet unpublished Patent Application P 195 42 626.6, since in this way the resulting aqueous coating composition are of better processibility.

In accordance with the as yet unpublished German Patent Application P 195 42 626.6, it is preferred as component (A2) to employ polyesters which are obtainable by reaction of p1) polycarboxylic acids or their esterifiable derivatives, together if desired with monocarboxylic acids, p2) polyols, together if desired with monools, p3) optionally further modifying components, and p4) optionally a component which is reactive with the reaction product of (p1), (p2) and, if used, (p3).

With respect to the components (p1) to (p4) and to the preparation of the polyesters (A2), reference may be made to the Patent Application P 195 42 626.6.

With particular preference, the polyesters employed as component (A2) have been prepared by a two-stage method which is described in P 195 42 626.6.

In accordance with the as yet unpublished German Patent Application P 195 42 626.6 it is optionally possible to prepare the polyacrylate resin (A1) at least partially in the presence of the polyester (A2). In this case, advantageously at least 20% by weight, and with particular advantage from 40 to 80% by weight, of component (A1) is prepared in the presence of component (A2).

As suitable polyurethane resins (A3), in accordance with the as yet unpublished Patent Application P 195 42 626.6 use is made in component (I) of, for example, the polyurethane resins described in the following documents: EP-A 355 433, DE-A-35 45 618, DE-A-38 13 866. DE-A-32 10 051, DE-A-26 24 442, DE-A-37 39 332, U.S. Pat. No. 4,719,132, EP-A-89 497, U.S. Pat. Nos. 4,558,090, 4,489,135, DE-A-36 28 124, EP-A-158 099, DE-A-29 26 584, EP-A-195 931, DE-A-33 21 180 and DE-A-40 05 961.

In component (I) it is preferred to employ polyurethane resins which can be prepared by reacting isocyanato-containing prepolymers with compounds which are reactive toward isocyanate groups, as described in detail in P 195 42 626.6.

Binders suitable as component (A4) are, in accordance with the as yet unpublished Patent Application P 195 42 626.6, all water-dilutable binders which are compatible with the other constituents of component (I), examples being acrylicized polyurethane resins and/or polyester acrylates.

Component (I) preferably comprises as binder (A)

(A1) at least 20% by weight of at least one acrylate copolymer (A1), (A2) from 0 to 30% by weight of at least one polyester (A2), (A3) from 0 to 80% by weight of at least one polyurethane resin (A3), and (A4) from 0 to 10% by weight of at least one further binder (A4), the sum of the proportions by weight of components (A1) to (A4) being in each case 100% by weight.

As constituent (B) component (I) can contain all customary paint pigments in proportions of from 0 to 60% by weight, based on component I. In this context it is possible to employ both the pigments which are customary in aqueous coating compositions, which do not react with water and/or do not dissolve in water, and the pigments which are customarily employed in conventional coating compositions. The pigments may consist of inorganic or organic compounds and may impart a special effect and/or color. The novel coating composition therefore ensures, on the basis of this large number of suitable pigments, the universal scope for use of the coating compositions, and enables the realization of a large number of colors.

Special-effect pigments which can be employed are metal flake pigments, such as commercially available aluminum bronzes, aluminum bronzes chromated in accordance with DE-A-36 36 183, and commercial stainless-steel bronzes, and also nonmetallic special-effect pigments, for example pearlescent pigments or interference pigments. Examples of suitable inorganic color-imparting pigments are titanium dioxide, iron oxides, sicotrans yellow and carbon black. Examples of suitable organic color-imparting pigments are indanthrene blue, cromophthal red, irgazine orange and heliogen green.

As constituent (C) component (I) contains at least one organic, optionally water-dilutable solvent. Such solvents may also participate in the reaction with the crosslinking component (II) and thus act as reactive diluents, and are described in detail in the as yet unpublished Patent Application P 195 42 626.6.

As constituent (D) component (I) optionally contains at least one neutralizing agent. Examples of suitable neutralizing agents are described in P 195 42 626.6. The neutralization can be carried out in organic phase or in aqueous phase. In this context the neutralizing agent can be added to component (I) and/or (II) and/or (III). Preferably, however, the neutralizing agent is added to component (III).

As constituent (E) component (I) may contain at least one rheology-controlling additive. Examples of rheology-controlling additives are given in the as yet unpublished Patent Application P 195 42 626.6.

Furthermore, component (I) may contain at least one further conventional paint additive. Examples of such additives are antifoams, dispersion auxiliaries, emulsifiers, and leveling auxiliaries.

For the preparation of the novel coating compositions it is preferred to employ components (I) which consist of (A) from 20 to 90% by weight, preferably from 35 to 80% by weight, of the binder (A), (B) from 0 to 60% by weight of at least one pigment and/or filler, (C) from 5 to 50% by weight, preferably from 10 to 40% by weight, of at least one organic, optionally water-dilutable solvent, and (D) from 0 to 20% by weight, preferably from 0.1 to 10% by weight, of at least one neutralizing agent E) from 0 to 20% by weight, preferably from 2 to 10% by weight, of at least one customary auxiliary and/or additive, the sum of the proportions by weight of components (A) to (E) being in each case 100% by weight, based on component (I).

Component (II)

It is preferred for the coating component (II) to comprise as crosslinking agent at least one preferably nonblocked di- and/or polyisocyanate (F1) which is optionally dispersed or dissolved in one or more organic, optionally water-dilutable solvents, and/or optionally at least one further crosslinking agent selected from at least one epoxide compound (F2) having at least two epoxide groups per molecule and/or at least one amino resin (F3).

The polyisocyanate component (F1) may comprise any desired organic polyisocyanates having free isocyanate groups attached to aliphatic, cycloaliphatic, araliphatic and/or aromatic structures. Preference is given to the use of polyisocyanates having 2 to 5 isocyanate groups per molecule and viscosities of from 100 to 2000 mPas (at 23 degrees C.). If desired, small quantities of organic solvent, preferably from 1 to 25% by weight based on pure polyisocyanate, can also be added to the polyisocyanates in order thus to improve the ease of incorporation of the isocyanate and, if appropriate, to reduce the viscosity of the polyisocyanate to a value within the abovementioned ranges. Examples of solvents suitable as additives for the polyisocyanates are ethoxyethyl propionate, butyl acetate and the like.

Examples of suitable isocyanates are described in the as yet unpublished German Patent Application P 195 42 626.6. Preference is given to the use of aliphatic or cycloaliphatic polyisocyanates as listed in P 195 42 626.6. The polyisocyanate component (F1) may, moreover, consist of any desired mixtures of the polyisocyanates mentioned by way of example. In a further embodiment of the invention, the polyisocyanate component (F1) consists of a mixture of blocked di- and/or polyisocyanates and the nonblocked di- and/or polyisocyanates already mentioned, as described in detail in P 195 42 626.6. In the novel coating compositions the polyisocyanate component (F1) is advantageously employed in a quantity of at least 70% by weight, particularly preferably in a quantity of from 80 to 100% by weight, based on the overall weight of the crosslinking agent (F).

Examples of suitable polyepoxides (F2) are all known aliphatic and/or cycloaliphatic and/or aromatic polyepoxides, based for example on bisphenol A or bisphenol F.

Suitable examples of component (F2) include the polyepoxides which are obtainable commercially under the designations Epikote® from Shell, Denacol® from Nagase Chemicals Ltd., Japan, examples being Denacol EX-411 (pentaerythritol polyglycidyl ether), Denacol EX-321 (trimethylolpropane polyglycidyl ether), Denacol EX-512 (polyglycerol polyglycidyl ether) and Denacol EX-521 (polyglycerol polyglycidyl ether).

The polyepoxide component (F2) is advantageously employed in the novel coating compositions in a quantity of from 0 to 30% by weight, particularly preferably in a quantity of from 2 to 20% by weight, based on the overall weight of the crosslinking agent (F).

Examples of suitable amino resins (F3) are imino-functional melamine resins, such as the products obtainable commercially under the name Cymel® 325 from Cyanamid and Luwipal® LR 8839 from BASF AG.

The amino resin (F3) is employed in the novel coating compositions advantageously in a quantity of from 0 to 30% by weight, particularly preferably in a quantity of from 2 to 20% by weight, based on the overall weight of the crosslinking agent (F).

Constituents (G) and (H) of coating component (II) correspond to constituents (C) and (E) of coating component (I).

In order to prepare the novel coating compositions it is preferred to employ components (II) which consist of (F) from 50 to 100% by weight, preferably from 60 to 90% by weight, of at least one crosslinking agent (F), (G) from 0 to 50% by weight, preferably from 10 to 40% by weight, of at least one organic, optionally water-dilutable solvent, and (H) from 0 to 20% by weight, preferably from 0 to 10% by weight, of at least one customary auxiliary and/or additive, the sum of the proportions by weight of components (F) to (H) being in each case 100% by weight, based on component (II).

Component (III)

Component (III) of the novel coating compositions contains, as constituent essential to the invention, at least one aqueous dispersion of a hydrophilicized polymer resin HP which is prepared by a single- or multistage method.

The single-stage method of preparing the aqueous dispersion of the hydrophilicized polymer resin HP is characterized in that in deionized water, a preemulsion PE comprising microparticles consisting of a hydrophobic polymer resin HP' and the monomeric constituents (aa1) an essentially carboxyl-free (meth)acrylic ester which is different from (aa2), (aa3) and (aa4) and is copolymerizable with (aa2), (aa3) and (aa4), or a mixture of such monomers,
(aa2) an ethylenically unsaturated monomer which is copolymerizable with (aa1), (aa3) and (aa4), carries at least one hydroxyl group per molecule and is essentially free from carboxyl groups,
(aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and
(aa4) an ethylenically unsaturated monomer which carries at least one carboxyl group per molecule and is copolymerizable with (aa1), (aa2) and (aa3), or a mixture of such monomers, is prepared by subjecting the aqueous dispersion of the hydrophobic polymer resin HP' and the aqueous emulsion of the monomeric constituents to high shear and subsequently the polymerizable constituents of the preemulsion PE are polymerized.

The multistage method of preparing the aqueous dispersion of the hydrophilicized polymer resin HP is characterized in that I. in deionized water, a preemulsion PE comprising microparticles consisting of the hydrophobic polymer resin HP' and the monomeric constituents (aa1) an essentially carboxyl-free (meth)acrylic ester which is different from (aa2) and (aa3) and is copolymerizable with (aa2) and (aa3), or a mixture of such monomers,
(aa2) an ethylenically unsaturated monomer which is copolymerizable with (aa1) and (aa3), carries at least one hydroxyl group per molecule and is essentially free from carboxyl groups,
(aa3) optionally an ethylenically unsaturated monotner which is copolymerizable with (aa1) and (aa2), is different from (aa1) and (aa2) and is essentially free from carboxyl groups, or a mixture of such monomers, is prepared by subjecting the aqueous dispersion of the hydrophobic polymer resin HP' and the aqueous emulsion of the monomeric constituents to high shear and subsequently the polymerization of the polymerizable constituents of the preemulsion PE is begun, and then II. during and/or after the conclusion, but not simultaneously with the commencement, of the polymerization of the polymerizable constituents of the preemulsion PE, a monomer mixture comprising (aa1) an essentially carboxyl-free (meth)acrylic ester which is different from (aa2), (aa3) and (aa4) and is copolymerizable with (aa2), (aa3) and (aa4), or a mixture of such monomers,
(aa2) an ethylenically unsaturated monomer which is copolymerizable with (aa1), (aa3) and (aa4), carries at least one hydroxyl group per molecule and is essentially free from carboxyl groups,
(aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and
(aa4) an ethylenically unsaturated monomer which carries at least one carboxyl group per molecule and is copolymerizable with (aa1), (aa2) and (aa3), or a mixture of such monomers is added in a feed stream and then polymerized.

The hydrophobic polymer resin HP' employed to prepare the preemulsion is preferably a polyaddition resin and/or a polycondensation resin.

Preferred polyaddition resins HP' are polyurethanes, while preferred polycondensation resins HP' are polyesters.

It is particularly preferred to employ polyaddition and/or polycondensation resins HP' which on average contain from 0.05 to 1.1, preferably from 0.2 to 0.9 and particularly preferably from 0.3 to 0.7 polymerizable double bonds.

It is very particularly preferred to employ, as polymer resins HP', polyurethane resins in accordance with DE-A-40 10 176, which are preferably prepared from the following components:

(b1) a polyester or polyether polyol which optionally contains polymerizable double bonds and has a number-average molecular weight Mn of from 400 to 5000 daltons, or a mixture of such polyether and polyester polyols,
(b2) a di- and/or polyisocyanate or a mixture of di- and/or polyisocyanates,
(b3) optionally a compound which has in the molecule at least one group which is reactive toward isocyanate groups and at least one group which is capable of forming anions, or a mixture of such compounds,
(b4) optionally a compound which in addition to a polymerizable double bond also contains at least one group which is reactive toward isocyanate groups, or a mixture of such compounds,
(b5) optionally a compound which has in the molecule group which is reactive toward isocyanate groups and at least one polyoxyalkylene group, or a mixture of such compounds, and
(b6) optionally at least one hydroxyl- and/or amino-containing organic compound having a molecular weight of from 60 to 600 daltons, or a mixture of such compounds.

In this context, the polyurethane resin HP' according to DE-A-40 10 176 should have a number-average molecular weight Mn of from 200 to 30,000, preferably from 1000 to 5000 daltons. The molecular weight of the polyurethane resin HP' can, as known to the person skilled in the art, be controlled in particular by the ratio and the functionality of the components (b1) to (b6) employed.

The polyurethane resin HP' can be prepared both in bulk and in organic solvents.

The polyurethane resin HP' can be prepared by simultaneous reaction of all starting compounds. In some cases, however, it is expedient to prepare the polyurethane resin HP' in stages. For example, it is possible to prepare, from components (b1) and (b2), an isocyanato-containing prepolymer which is then reacted further with component (b4).

It is possible, furthermore, to prepare from components (b1), (b2) (b4) and, if appropriate, (b3) and (b5) an isocyanato-containing prepolymer which is then reacted with component (b6) to form a relatively high molecular eight polyurethane resin HP'.

In cases where the compound employed as component (b4) contains only one group which is reactive toward isocyanate groups, it is possible in a first stage to use (b2) and (b4) to prepare an isocyanato-containing precursor which can subsequently be reacted further with the other components.

The reaction of components (b1) to (b6) can expediently be carried out in the presence of catalysts, such as, for example, dibutyltin dilaurate, dibutyltin maleate, tertiary amines or others.

The quantities of components (b1), (b2), (b3), (b4), (b5) and (b6) to be employed result from the desired molecular weight and the desired acid number. The polymerizable double bonds can be introduced into the polyurethane resin HP' by using components (b1) and/or components (b4) containing polymerizable double bonds. It is preferred to introduce the polymerizable double bonds by way of component (b4).

The detailed description of the individual components (b1) to (b6) and their preferred variants can be taken from DE-A-40 10 176.

In further preferred embodiments of the invention component (b1) consists of up to 100% by weight of alpha, omega-polymethacrylate diols as described, for example, in EP-A-0 622 378, and/or component (b4) contains an allylether group, acrylate group and/or methacrylate group as polymerizable double bond.

In accordance with the single-stage novel process, in deionized water a preemulsion PE comprising microparticles consisting of emulsifiers, a hydrophobic polymer resin HP' and the monomeric constituents (aa1) an essentially carboxyl-free (meth)acrylic ester which is different from (aa2), (aa3) and (aa4) and is copolymerizable with (aa2), (aa3) and (aa4), or a mixture of such monomers,
(aa2) an ethylenically unsaturated monomer which is copolymerizable an ethylenically unsaturated monomer which is copolymerizable with (aa1), (aa3) and (aa4), carries at least one hydroxyl group per molecule and is essentially free from carboxyl groups,
(aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and
(aa4) an ethylenically unsaturated monomer which carries at least one carboxyl group per molecule and is copolymerizable with (aa1), (aa2) and (aa3), or a mixture of such monomers, is prepared by subjecting the aqueous dispersion of the hydrophobic polymer resin HP' and the aqueous emulsion of the monomeric constituents to high shear and subsequently the polymerizable constituents of the preemulsion PE are polymerized using free-radical-forming polymerization initiators.

The monomeric constituents are preferably employed in quantities of:

from 30 to 98% by weight of (aa1),
from 1 to 30% by weight of (aa2),
from 0 to 20% by weight of (aa3), and
from 1 to 20% by weight of (aa4)

the sum of components (aa1) to (aa4) making up 100% by weight.

As monomeric constituents (aa1) it is possible, for example, to employ: cycloalkyl (meth)acrylates, such as cyclopentyl (meth)acrylate or, preferably, cyclohexyl (meth) acrylate or tert-butylcyclohexyl (meth)acrylate, isobornyl (meth)acrylate, phenyl (meth)acrylate, phenylalkyl (meth) acrylates, naphthyl (meth)acrylate, alkyl acrylates or alkyl methacrylates having up to 20 carbon atoms in the ester radical, for example methyl, ethyl, propyl, butyl, pentyl, hexyl, octyl, ethylhexyl decyl stearyl and lauryl acrylate and methacrylate, or mixtures of these monomers.

As monomeric constituents (aa2) it is possible, for example, to employ: hydroxyalkyl esters of acrylic esters, methacrylic acid or of another alpha,beta-unsaturated carboxylic acid, it being possible for these esters to be derived from an alkylene glycol which is esterified with the acid or to be obtained by a reaction of the acid with an alkylene oxide. Furthermore, the monomeric constituents aa2) may carry units of polyalkylene oxide, for example polyethylene oxide or polypropylene oxide, polylactone or polylactam having terminal hydroxyl groups.

As component (aa2) it is preferred to employ hydroxyalkyl esters of acrylic acid and methacrylic acid in which the hydroxyalkyl group contains up to 4 carbon atoms, or mixtures of these hydroxyalkyl esters. Examples of such hydroxylalkyl [sic] esters are 2-hydroxyethyl (meth) acrylate, 2-hydroxypropyl (meth)acrylate, 3-hydroxypropyl (meth)acrylate, 3-hydroxybutyl (meth)acrylate and 4-hydroxybutyl (meth)acrylate. Corresponding esters of other alpha,beta-unsaturated acids, for example ethacrylic acid, crotonic acid and similar acids having up to 6 carbon atoms per molecule, can also be employed.

Furthermore, as monomer constituents (aa2) it is possible, for example, to employ adducts of (meth)acrylic acid and versatic acid glycidyl ester.

As optionally present monomer constituents (aa3) it is possible, for example, to employ: vinylaromatic hydrocarbons, such as styrene, alpha-methyl styrene or vinyltoluene, acrylamide and methacrylamide and also acrylonitrile and methacrylonitrile, or mixtures of these substances.

As component (aa4), preference is given to employing acrylic acid and/or methacrylic acid, it also being possible to employ other ethylenically unsaturated acids having up to 6 carbon atoms in the molecule. Examples of such acids are ethacrylic acid, crotonic acid, maleic acid, fumaric acid and itaconic acid.

Also present in the aqueous phase are emulsifiers as are employed, for example, in the case of conventional emulsion polymerization, examples being amine salts or metal salts of dodecylbenzenesulfonic acid, sodium dialkylsulfosuccinate, ethoxylated alkyl phenols or other emulsifying auxiliaries known to the person skilled in the art, in quantities of between 0.1 and 10% by weight, preferably between 0.5 and 5% by weight, based on the preemulsion PE.

It is also possible for small quantities of inert organic solvents to be employed together with the polymer resin HP', which are used to lower the viscosity of the polymer resin HP' and which after mixing are present in the aqueous phase.

In order to produce the high shearing in the preparation of the preemulsion PE, which leads to the dispersion of the polymer resin HP' and the monomeric components (aa1) to (aa4) in microparticles, use is made of devices as described, for example, in EP-B-0 401 565 or in DE-A-195 10 651. It is possible, for example, to use the Microfluidizer® described in EP-B-0 401 565, from Microfluidics Corp., Newton, Mass., U.S.A.

As polymerization initiators it is possible to employ both water-soluble and oil-soluble free-radical initiators. Preference is given to employing water-soluble free-radical initiators, such as, for example, peroxy compounds, such as ammonium peroxydisulfate, sodium peroxydisulfate or hydrogen peroxide, and also redox systems, for example ammonium peroxydisulfate with sodium metabisulfite.

The multistage novel method is carried out as follows: in stage I, the preemulsion PE comprising an aqueous phase, the hydrohobic [sic] polymer resin HP' and the monomeric constituents (aa1) an essentially carboxyl-free (meth)acrylic ester which is different from (aa2) and (aa3) and is copolymerizable with (aa2), (aa3) and (aa4), or a mixture of such monomers,
(aa2) an ethylenically unsaturated monomer which is copolymerizable with (aa1) and (aa3), carries at least one hydroxyl group per molecule and is essentially free from carboxyl groups, and
(aa3) optionally an ethylenically unsaturated monomer which is copolymerizable with (aa1) and (aa2), is different from (aa1) and (aa2) and is essentially free from carboxyl groups, or a mixture of such monomers, is prepared by mixing with high shearing.

The monomeric constituents are preferably employed in quantities of from 60 to 99% by weight of (aa1), from 1 to 20% by weight of (aa2), and from 0 to 20% by weight of (aa3), the sum of the monomeric constituents (aa1) to (aa3) making up 100% by weight.

In stage I of the novel method, following the preparation of the above-described preemulsion PE, the polymerizable constituents (aa1), (aa2) and, if used, (aa3) of the preemulsion PE are polymerized using the free-radical-forming polymerization initiators already mentioned.

In a preferred embodiment of the method, stage I is carried out by initially charging deionized water to the reaction vessel and heating it to a temperature of between preferably 40 and 95 degrees C., the temperature depending on the decomposition rate of the polymerization initiator. Then an aqueous phase, containing the polymerization initiator, and the aqueous preemulsion PE are metered in in separate feed streams, preferably simultaneously. The metering procedure lasts for between 0.5 and 8 hours, preferably between 1 and 4 hours.

During and/or after conclusion of the polymerization of the polymerizable constituents of the preemulsion PE, but not simultaneously with commencement of the feeding of the preemulsion PE into the reaction vessel as described in connection with the implementation of stage I, in stage II of the novel method a monomer mixture, optionally containing at least one known emulsifiers [sic], described in connection with the preparation of the preemulsion PE, for emulsion polymerization, and the monomeric constituents (aa1) an essentially carboxyl-free (meth)acrylic ester which is different from (aa2), (aa3) and (aa4) and is copolymerizable with (aa2), (aa3) and (aa4), or a mixture of such monomers,
(aa2) an ethylenically unsaturated monomer which is copolymerizable an ethylenically unsaturated monomer which is copolymerizable with (aa1), (aa3) and (aa4), carries at least one hydroxyl group per molecule and is essentially free from carboxyl groups,
(aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and
(aa4) an ethylenically unsaturated monomer which carries at least one carboxyl group per molecule and is copolymerizable with (aa1), (aa2) and (aa3), or a mixture of such monomers are added in a feed stream.

The monomers (aa1) to (aa3) already described in connection with the preparation of the preemulsion PE in the single-stage method are preferably very largely identical with the monomers employed in stage I.

The monomeric constituents in stage II are preferably employed in quantities of:

from 30 to 98% by weight of (aa1), from 1 to 30% by weight of (aa2), from 0 to 20% by weight of (aa3) and from 1 to 20% by weight of (aa4), the sum of the monomeric constituents (aa1) to (aa4) making up 100% by weight.

The feeding of the monomers employed in stage II lasts in general for between 0.5 and 6 hours.

After the end of the addition of monomer, the aqueous dispersion is held at from 60 to 95 degrees C. for from 0.5 to 4 hours for afterreaction.

The resulting aqueous dispersion of the hydrophilicized polymer resin HP has a solids content of between 10 and 65% by weight, preferably between 20 and 60% by weight, based on the aqueous dispersion.

In addition to the aqueous dispersion, essential to the invention, of the hydrophilicized polymer resin HP it is possible for aqueous dispersions of the components (A1) and/or (A2) and/or (A3) and/or (A4) already described to be present in component (III), the preparation of which is described in the as yet unpublished German Patent Application P 195 42 626.6.

The Novel Coating Compositions

In order to prepare the coating compositions, components (I), (II) and (III) are preferably employed in quantities such that the ratio of equivalents of hydroxyl groups of the hydrophilicized polymer resin HP and of components (A1), (A2), (A3) and (A4) to the crosslinking groups of the crosslinking agent (F) is between 1:2 and 2:1, preferably between 1:1.2 and 1:1.5.

Furthermore, the novel coating compositions preferably have an overall content of customary paint additives of from 0 to 10% by weight, of organic solvents of from 5 to 25% by weight, preferably from 10 to 20% by weight, of water of from 25 to 60% by weight, preferably from 30 to 50% by weight, of binder (A) of from 15 to 60% by weight, preferably from 20 to 50% by weight, of crosslinking agent (F) of from 5 to 30% by weight, preferably from 10 to 20% by weight, and of pigments and/or fillers of from 0 to 50% by weight, preferably from 0 to 30% by weight, based in each case on the overall weight of the coating composition.

Component (I) is prepared by methods known to the person skilled in the art, by mixing and optionally dispersing the individual constituents. Thus, for example, the incorporation of color-imparting pigments is conventionally carried out by grinding (dispersing) the respective pigments in one or more binders. The grinding of the pigments is carried out with the aid of customary devices, for example bead mills and sand mills.

The novel coating compositions are preferably prepared in accordance with the following mixing techniques from components (I), (II), (III) and optionally water as additional component (IV):

In order to prepare the novel coating compositions, components (I) and (II) are first of all mixed, these components (I) and (II) preferably containing no neutralizing agent. Then, component (IV) is optionally added to this mixture. One option is then to add the mixture thus obtained to component (III) containing neutralizing agents, and to disperse the resulting coating composition; an alternative option is then to add component (III), containing the neutralizing agent, to the mixture thus obtained.

Furthermore, the novel coating composition can be prepared, for example, in analogy to the procedure just described, but with the neutralizing agent not being present in component (III) but instead being added separately prior to the addition of component (III).

Moreover, the novel coating composition can also be prepared by first of all adding the neutralizing agent to component (I). Of course it is also possible, instead of this mixing operation, to employ a component (I) which already contains the neutralizing agent. The component (I) obtained in this way is then mixed with component (II) and, if appropriate, with component (IV) (simultaneous or successive mixing with (II) and, if appropriate, (IV)), and the mixture thus obtained is then either added to component (III) or has component (III) added to it, and the coating composition obtained in this way in each case is homogenized by dispersion.

The novel coating compositions can be applied by customary application methods, for example spraying, knife coating, spreading, dipping, to any desired substrates, for example metal, wood, plastic or paper.

The novel coating compositions are customarily cured at temperatures below 120 degrees C., preferably at temperatures of not more than 80 degrees C. In specific embodiments of the novel coating compositions it is also possible to employ higher curing temperatures.

The novel coating compositions are preferably employed for the production of top coats. The novel coating compositions can be employed both in the production-line finishing and in the refinishing of automobile bodies. They are preferably employed, however, in the area of refinishing and in the coating of plastics parts.

The novel aqueous coating compositions can be employed as fillers and for producing one-layer topcoats, and also as pigmented basecoats or as clearcoats in a process for producing a multicoat finish (basecoat/clearcoat process).

The invention will now be illustrated in more detail with reference to working examples. In these examples all parts and percentages are by weight unless expressly stated otherwise.

EXAMPLE

Preparation and Application of a Clearcoat

Example 1

Preparation of a Water-dilutable Acrylate Resin A1) for Component (I)

1000 g of ethoxyethyl propionate are charged to a 4l steel vessel equipped with monomer feed, initiator feed, thermometer, oil heating and reflux condenser, and are heated to 130 degrees C. Then a solution of 89.4 g of tert-butyl peroxyethylhexanoate in 145.7 g of ethoxyethyl propionate is added at a rate such that the addition is over after 4.5 hours. 5 minutes after beginning the addition of the tert-butyl peroxyethylhexanoate solution, the addition of the monomer mixture of (a1), (a2) and (a6):

(a1): 285 g of n-butyl methacrylate
    229 g of methyl methacrylate,
    640 g of lauryl methacrylate
        (commercial product Methacrylester 13 from Röhm GmbH, Darmstadt), (a2): 270 g of hydroxyethyl acrylate and (a6): 238 g of styrene is also commenced, the overall feed time for the first monomer feed being 4 hours.

2.5 hours after the first monomer feed was started, a second monomer feed is commenced which consists of a mixture of (a2), (a3) and 27 g of ethoxyethyl propionate:

(a2): 112 g of hydroxyethyl acrylate and (a3): 54 g of acrylic acid, the overall feed time for the second monomer feed being 1.5 hours.

The mixture (a1), (a2), (a3) and (a6) is added at a rate such that the addition is over after 4 hours. After finishing the addition of the tert-butyl peroxyethylhexanoate solution, the reaction mixture is held at 120 degrees C. for 2 h more. The reaction mixture is adjusted to a solids content of 79.2% by distillative removal of the organic solvent (for 1 hour at 130 degrees C. under reduced pressure). The acrylate resin obtained in this way has an OH number of 140 mg of KOH/g of solid resin, an acid number of 31.1 mg of KOH/g of solid resin, a number-average molecular weight Mn of 3220 daltons and a weight-average molecular weight Mw of 7505 daltons. The viscosity of a 55% strength solution of the acrylate resin in ethoxyethylpropionate is 4.4 dPa·s (23° C.)

Example 2

Preparation of the Dispersion of a Polyacrylate Resin (A1) for Component (III)

470 parts by weight of n-butanol as solvent component are charged to a 4l steel vessel equipped with two monomer feeds, initiator feed, stirrer and reflux condenser, and are heated to 110 degrees C.

Then a solution of 36 parts by weight of tert-butyl peroxyethylhexanoate in 92.4 parts by weight of n-butanol is added at a rate such that the addition is over after 5.5 hours.

With the beginning of the addition of the tert-butyl peroxyethylhexancate solution, the addition of the mixture of (a1) to (a6):

(a1): 240 parts by weight of n-butyl methacrylate,
    209 parts by weight of methyl methacrylate,
    120 parts by weight of lauryl methacrylate (methacrylester 13 from Röhm GmbH), (a2): 270 parts by weight of hydroxyethyl methacrylate and (a6): 180 parts by weight of styrene, is also commenced. The mixture of (a1), (a2) and (a6) is added at a rate such that the addition is over after 5 hours.

3.5 hours after beginning the first monomer feed, a second monomer feed is started which is ended in conjunction with the first monomer feed and which consists of a mixture of monomer components (a2) and (a5):

(a2): 120 parts by weight of hydroxyethyl methacrylate and (a5): 61 parts by weight of acrylic acid.

After the end of the addition of the tert-butyl peroxyethylhexanoate solution the reaction mixture is held at 120 degrees C. for 2 h more.

Thereafter, 12 parts by weight of ethoxyethyl propionate as solvent component are added.

The resin solution is then cooled to 80 degrees C., and is neutralized over the course of about 30 minutes with 63 parts by weight of dimethylethanolamine in 1379 parts by weight of deionized water to a degree of neutralization of 85%.

Subsequently, the solvent mixture of ethoxyethyl propionate and n-butanol is removed by azeotropic distillation until not more than 1% by weight of solvent, based on the dispersion, can be detected by gas chromatography.

After the end of the distillation the dispersion is adjusted to the following final characteristics by the addition of deionized water:

Acid number of the overall solids content: 38.1 mg of KOH/g,

Solids content (1 hour, 130 degrees C.): 38.5%, pH: 7.57.

Example 3

Preparation of the Dispersion of a Polyurethane Resin (A3) for Component (III)

3.1. Preparation of the Polyester Precursor 1088 g of neopentylglycol hydroxypivalate, 120 g of phthalic anhydride, 1268 g of isophthalic acid, 21 g of 2-butyl-2-ethylpropanediol, 489 g of neopentyl glycol and 113 g of xylene as entraining agent are weighed into a 4 l steel reactor which is suitable for the polycondensation reactions.

The mixture is subsequently heated and the water of condensation is removed continuously to an acid number of <3.5 mg of KOH/g. The batch is cooled to about 100° C. and is adjusted with ethoxyethyl propionate to a solids content of 79.7%. The resulting polyester diol has an acid number of 4.4 mg of KOH/g. The viscosity of a 60% strength solution of the polyester diol in ethoxyethyl propionate is 3.6 dPa.s at 23 degrees C.

3.2. Preparation of the Polyurethane Dispersion

749 G of the polyester diol according to Example 3.1, 6.6 g of 2-butyl-2-ethylpropanediol, 69 g of dimethylolpropionic acid and 318 g of m-tetramethylxylylene diisocyanate are charged to a 4 l steel reactor which is suitable for the polyurethane resin synthesis, and the mixture is reacted at 110 degrees C. to a constant diisocyanate content. Then 101 g of trimethylolpropane are added and heating is continued until the end of the reaction. Subsequently, 31.5 g of ethoxyethyl propionate are added. After the reaction mixture has been stirred for 30 minutes more it is neutralized with 36.7 g of dimethylethanolamine. The reaction mixture, which still has a temperature of from 90 to 110 degrees C., is thereafter dispersed in 1929.2 g of deionized water which has a temperature of 60 degrees C.

The resulting polyurethane dispersion is free from gel particles, has a solids content of 36.1%, an acid number of 30.3 mg of KOH/g and a pH of 7.1. At a temperature of 40 degrees C., the polyurethane dispersion is stable on storage for more than 4 weeks.

Example 4

Preparation of the Aqueous Dispersion of the Hydrophilicized Polyurethane Acrylate Resin HP for Component (III)

Example 4.1

Preparation of the Polyester Precursor for the Hydrophobic Polyurethane Resin HP'

39.487 parts of dimeric fatty acid (Pripol® 1013 from Unichema), 21.739 parts of hexane-1,6-diol, 11.689 parts of isophthalic acid and 1.035 parts of xylene as entraining agent are are [sic] weighed into a steel reactor which is suitable for polycondensation reactions.

The mixture is then heated to a temperature of 220 degrees C. and the water of condensation is removed continuously, while maintaining the temperature at a constant 220 degrees C., to an acid number of <4 mg of KOH/g.

The batch is cooled to 80 degrees C. and is adjusted with 23.272 parts of methyl ethyl ketone to a solids content of about 73%. The resulting polyester diol has an acid number of about 2.5 mg of KOH/g and a hydroxyl number of about 71 mg of KOH/g. The viscosity of the 73% strength solution of the polyester diol in methyl ethyl ketone is about 2.0 dPas at 23 degrees C.

Example 4.2

Preparation of the Hydrophobic Polyurethane Resin HP'

55.13 parts of the polyester dial according to Example 4.1, 4.24 parts of neopentyl glycol, 2.28 parts of trimethylolpropane monoallyl ether, 26.91 parts of tetramethylxylylene diisocyanate, 3.76 parts of methyl ethyl ketone and 0.03 part of dibutyltin dilaurate are charged to a steel reactor which is suitable for the polyurethane resin synthesis.

The mixture is then heated, with stirring, to 80 degrees C. and the temperature is held at 80 degrees C. until the isocyanate content is about 2.6% by weight.

Subsequently, 7.65 parts of trimethylolpropane are added and the temperature is held further at 80 degrees C. until the isocyanate content is below or 0% by weight.

The viscosity of the 82% strength solution of the polyurethane resin PUR' in methyl ethyl ketone is between 3.5 and 6.0 dPas (1:1 in N-methylpyrrolidone).

Example 4.3

Preparation of the Aqueous Dispersion of the Hydrophilicized Polyurethane Acrylate Resin HP Stage I The preemulsion PE is prepared using a Microfluidizer® from Microfluidics Corp. (Newton, Mass., U.S.A.) at a pressure of 550 bar in 2 passes, said preemulsion PE comprising:

11.07 parts of polyurethane resin HP' according to Example 4.2, a mixture of:
    5.40 parts of methyl methacrylate,
    4.05 parts of n-butyl acrylate and
    2.70 parts of n-butyl methacrylate
as component (aa1),
    1.35 parts of hydroxyethyl methacrylate
as component (aa2),
    22.41 parts of deionized water, and
    3.00 parts of anionic emulsifier Abex ® EP 110 from Rhone-Poulenc (ammonium sulfonate of an approximately penta-ethoxylated nonylphenol).

23.796 parts of deionized water are charged to a steel vessel which is suitable for free-radical polymerizations, having 2 monomer feeds and 1 initiator feed, and are heated to 82 degrees C.

Subsequently, over the course of 1.5 hours, the preemulsion PE comprising one of the two monomer feeds and an aqueous initiator solution consisting of:

3.400 parts of deionized water and 0.054 part of ammonium peroxidisulfate from the initiator feed is metered in simultaneously and at a uniform rate, the temperature being maintained at 82 degrees C.

Stage II

After the end of the addition of the preemulsion PE described in stage I and of the initiator solution, the metered addition is made, over the course of 2 hours via the second monomer feed, of a mixture comprising:

a mixture of:
    9.00 parts of methyl methacrylate,
    6.75 parts of n-butyl acrylate and
    3.70 parts of n-butyl methacrylate
as component (aa1),
    2.25 parts of hydroxyethyl methacrylate
as component (aa2),
    0.79 part of methacrylic acid
as component (aa4), and
    0.10 part of nonionic emulsifier Igepal ® CO 850 from Rhone-Poulenc (approximately dideca-ethoxylated nonylphenol), the temperature being maintained at 82 degrees C. For afterreaction, the reaction mixture is held at 82 degrees C. for 2 hours more.

The resulting aqueous dispersion of the hydrophilicized polyurethane acrylate resin HP has the following characteristics:

Solids content: 45%

Acid number: 15–17 mg of KOH/g pH: 2.5–3.0 mean particle size: about 200 nm

Example 5

Preparation of Component (I) of the Coating Composition

The constituents indicated below are used to prepare component (I) by mixing by means of a stirrer (600 revolutions per minute):

| | |
|---|---|
| 15.0 parts by weight | of organic water-dilutable acrylate resin (A1) according to Example 1 |
| 4.0 parts by weight | of butyl glycol acetate, |
| 3.2 parts by weight | of butyl glycol, |
| 1.0 part by weight | of wetting agent (Tensid S ®, Biesterfeld), |
| 0.2 part by weight | of leveling agent based on a polyether-modified dimethylsiloxane copolymer (Byk® 331 from Byk Gulden) and |
| 0.6 part by weight | of leveling agent (Fluorad ® FC 430 from 3M: 10% strength in ethyl ethoxypropionate) |

Example 6

Preparation of Component (II) of the Coating Composition

The constituents indicated below are used to prepare component (II) by mixing by means of a stirrer (600 revolutions per minute):

| | |
|---|---|
| 2.7 parts by weight | of polyisocyanate based on hexamethylene diisocyanate allophanate (Desmodur ® VPLS 2102 from Bayer AG), |
| 10.2 parts by weight | of polyisocyanate based on hexamethylene diisocyanate trimer (Tolonate ® HDTLV from Rhone-Poulenc), and |
| 1.5 parts by weight | of butyl glycol acetate |

Example 7

Preparation of Component (III) for the Coating Composition

The constituents indicated below are used to prepare component (III) by mixing by means of a stirrer (600 revolutions per minute):

| | |
|---|---|
| 30.0 parts by weight | of deionized water, |
| 0.5 part by weight | of dimethylethanolamine, |
| 2.0 parts by weight | of thickening agent based on polyurethane (Dapral ® T210 from Akzo), |
| 9.0 parts by weight | of the aqueous dispersion of the hydrophilicized polyurethane acrylate HP according to Example 4, the pH of the dispersion being adjusted beforehand to 7.0 using dimethylethanolamine, and |
| 20.0 parts by weight | of polyurethane dispersion (A3) according to Example 3. |

Example 8

Preparation of the Novel Clearcoat KL from Components (I), (II) and (III)

The novel clearcoat KL is prepared by mixing components (I), (II) and (III) by means of a stirrer (600 revolutions per minute), by stirring component (II) into component (I) and stirring the resulting mixture into component (III).

| Comparison Example 9: | Preparation of a clearcoat KL' from components (I), (II) and (III) in accordance with the as yet unpublished German Patent Application P 195 42 626.6 |
|---|---|

Example 9.1

Preparation of Component (I) of the Coating Composition

The constituents indicated below are used to prepare component (I) by mixing by means of a stirrer (600 revolutions per minute):

| 15.0 parts by weight | of organic water-dilutable acrylate resin (A1) according to Example 1 |
|---|---|
| 4.0 parts by weight | of butyl glycol acetate, |
| 3.2 parts by weight | of butyl glycol, |
| 1.0 parts by weight | of wetting agent (Tensid S ®, Biesterfeld), |
| 0.2 part by weight | of leveling agent based on a polyether-modified ditmethylsiloxane copolymer (Byk ® 331 from Byk Gulden) and |
| 0.6 part by weight | of leveling agent (Fluorad ® FC 430 from 3M: 10% strength in ethyl ethoxypropionate) |

Example 9.2

Preparation of Component (II) of the Coating Composition

The constituents indicated below are used to prepare component (II) by mixing by means of a stirrer (600 revolutions per minute):

| 3.0 parts by weight | of polyisocyanate based on hexamethylene diisocyanate allophanate (Desmodur ® VPLS 2102 from Bayer AG), |
|---|---|
| 11.0 parts by weight | of polyisocyanate based on hexamethylene diisocyanate trimer (Tolonate ® HDTLV from Rhone-Poulenc), and |
| 1.5 parts by weight | of butyl glycol acetate |

Example 9.3

Preparation of Component (III) for the Coating Composition

The constituents indicated below are used to prepare component (III) by mixing by means of a stirrer (600 revolutions per minute):

| 28.0 parts by weight | of deionized water, |
|---|---|
| 0.5 part by weight | of dimethylethanolamine, |
| 2.0 parts by weight | of thickening agent based on polyurethane (Dapral ® T210 from Akzo), |
| 10.0 parts by weight | of the aqueous dispersion of the polyacrylate resin (A1) according to Example 2, and |
| 20.0 parts by weight | of polyurethane dispersion (A3) according to Example 3. |

Example 9.4

Preparation of the Clearcoat KL' from Components (I), (II) and (III) According to Examples 9.1 to 9.3

The clearcoat KL' is prepared by mixing components (I), (II) and (III) according to Examples 9.1 to 9.3 by means of a stirrer (600 revolutions per minute), by stirring component (II) into component (I) and stirring the resulting mixture into component (III).

Example 10

Application of the Clearcoats KL According to Example 8 and KL' According to Comparison Example 9, and Testing of the Baked Coating Films A water-dilutable basecoat composition pigmented with aluminum flakes, according to EP-A-279 813, is applied to a phosphatized steel panel coated with a commercial electrodeposition coating and a commercial filler, so as to give a dry film thickness of from 12 to 15 μm.

The applied basecoat composition is dried at room temperature for 10 minutes and at 60 degrees C. for 10 minutes.

The topcoat compositions according to Example 8 and Comparison Example 9 are then sprayed onto the basecoat in 3 spray passes with an intermediate flash-off time of 15 minutes. Finally, drying is carried out at room temperature for 60 minutes and the panels are baked in a convection oven at 60 degrees C. for 30 minutes. The multilayer coatings thus obtained were subjected to a number of tests, the results of which are shown in Table 1.

Table 1: Properties of the coatings produced in accordance with Example 10:

| | Coating according to | |
|---|---|---|
| | Example 8 Clearcoat KL | Comparison Example 9 Clearcoat KL' |
| Coat thickness (micrometer) | 55 | 50 |
| Leveling (visual) | very good | very good |
| Behavior in the condensation test (visual) | slight swelling | slight swelling |

-continued

| | Coating according to | |
|---|---|---|
| | Example 8 Clearcoat KL | Comparison Example 9 Clearcoat KL' |
| Drying behavior[1] | 2 | 4 |

[1]Assessment of the drying behavior:
1 = very quick
2 = quick
3 = moderately quick
4 = slow
5 = very slow

What is claimed is:

1. A coating composition having at least three components, comprising
   1.) component (I), comprising a binder (A) comprising at least one member selected from the group consisting of
      (A1) an acrylate copolymer (A1) which is dispersed or dissolved in one or more organic, optionally water-dilutable solvents and contains hydroxyl groups and acid groups which can be converted into the corresponding acid anion groups,
      (A2) a polyester resin (A2) which is dispersed or dissolved in one or more organic, optionally water-dilutable solvents and contains hydroxyl groups and acid groups which can be converted into the corresponding acid anion groups,
      (A3) a polyurethane resin (A3) which is dispersed or dissolved in one or more organic, optionally water-dilutable solvents and contains hydroxyl groups and acid groups which can be converted into the corresponding acid anion groups,
      (A4) optionally at least one further binder, and mixtures thereof,
   2.) component (II) comprises a crosslinking agent (F) comprising at least one member selected from the group consisting of a crosslinking agent (F1), a crosslinking agent (F2), a crosslinking agent (F3), and mixtures thereof, wherein crosslinking agent (F1) is selected from the group consisting of a diisocyanate, a polyisocyanate, and mixtures thereof, crosslinking agent (F2) is selected from the group consisting of epoxide compounds having at least two epoxide groups per molecule, and wherein crosslinking agent (F3) is selected from the group consisting of amino resins, and
   3.) component (III) comprises at least one aqueous dispersion of a hydrophilicized polymer resin HP, and optionally, one or more components selected from the group consisting of (A1), (A2), (A3), (A4), and mixtures thereof, in aqueous dispersion,
   characterized in that the aqueous dispersion of the hydrophilicized polymer resin HP is prepared by a method comprising
      subjecting to high shear in deionized water, an aqueous dispersion of a hydrophobic polymer resin HP' and an aqueous emulsion of monomeric constituents to form a preemulsion PE comprising microparticles consisting of the hydrophobic polymer resin HP' and the monomeric constituents, wherein the aqueous emulsion of monomeric constituents comprises:
         (aa1) an essentially carboxyl-free (meth)acrylic ester which is different from (aa2), (aa3) and (aa4) and is copolymerizable with (aa2), (aa3) and (aa4), or a mixture of such monomers,
         (aa2) an ethylenically unsaturated monomer which is copolymerizable with (aa1), (aa3) and (aa4), carries at least one hydroxyl group per molecule and is essentially free from carboxyl groups,
         (aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and (aa4) an ethylenically unsaturated monomer which carries at least one carboxyl group per molecule and is copolymerizable with (aa1), (aa2) and (aa3), or a mixture of such monomers, and subsequently polymerizing the polymerizable constituents of the preemulsion PE to form the aqueous dispersion of the hdyrophilicized polymer resin HP.

2. The coating composition of claim 1, characterized in that the aqueous dispersion of the hydrophilicized polymer resin HP present in component (III) is prepared by a multistage method comprising
   I. subjecting to high shear in deionized water, an aqueous dispersion of a hydrophobic polymer resin HP' and an aqueous emulsion of monomeric constituents to form a preemulsion PE comprising microparticles consisting of the hydrophobic polymer resin HP' and the monomeric constituents, wherein the aqueous emulsion of monomeric constituents comprises:
      (aa1) an essentially carboxyl-free (meth)acrylic ester which is different from (aa2) and (aa3) and is copolymerizable with (aa2) and (aa3), or a mixture of such monomers,
      (aa2) an ethylenically unsaturated monomer which is copolymerizable with (aa1) and (aa3), carries at least one hydroxyl group per molecule and is essentially free from carboxyl groups, and
      (aa3) optionally an ethylenically unsaturated monomer which is copolymerizable with (aa1) and (aa2), is different from (aa1) and (aa2) and is essentially free from carboxyl groups, or a mixture of such monomers, and subsequently beginning polymerizing the polymerizable constituents of the preemulsion PE,
   II. adding a monomer feed stream to the preemulsion PE sometime after polymerizing of the polymerizable constituents of the preemulsion PE is begun, the monomer feed stream comprising
      (aa1) an essentially carboxyl-free (meth)acrylic ester which is different from (aa2) and (aa3) and is copolymerizable with (aa2), (aa3) and (aa4), or a mixture of such monomers,
      (aa2) an ethylenically unsaturated monomer which is copolymerizable with (aa1), (aa3) and (aa4), carries at least one hydroxyl group per molecule and is essentially free from carboxyl groups,
      (aa3) optionally an ethylenically unsaturated monomer which is copolymerizable with (aa1), (aa2) and (aa4), is different from (aa1), (aa2) and (aa4) and is essentially free from carboxyl groups, or a mixture of such monomers, and
      (aa4) an ethylenically unsaturated monomer which carries at least one carboxyl group per molecule and is copolymerizable with (aa1), (aa2) and (aa3), or a mixture of such monomers, and
   polymerizing the monomer feed stream.

3. The coating composition of claim 1 wherein the hydrophobic polymer HP' is selected from the group consisting of a polyaddition resin, a polycondensation resin, and mixtures thereof.

4. The coating composition of claim 1 wherein the hydrophobic polymer HP' comprises from 0.05 to 1.1 polymerizable double bonds per polymer molecule.

5. The coating composition of claim 1 wherein the hydrophobic polymer HP' is a polyurethane resin.

6. The coating composition of claim 5, wherein the polyurethane resin HP' comprises:
(b1) a polyester or polyether polyol which optionally contains polymerized double bonds and has a number-average molecular weight Mn of from 400 to 5000 daltons, or a mixture of such polyether and polyester polyols,
(b2) a di- and/or polyisocyanate or a mixture of di- and/or polyisocyanates,
(b3) optionally a compound which has in the molecule at least one group which is reactive toward isocyanate groups and at least one group which is capable of forming anions, or a mixture of such compounds,
(b4) optionally a compound which in addition to a polymerizable double bond also contains at least one group which is reactive toward isocyanate groups, or a mixture of such compounds,
(b5) optionally a compound which has in the molecule a group which is reactive toward isocyanate groups and at least one polyoxyalkylene group, or a mixture of such compounds, and
(b6) optionally at least one hydroxyl- and/or amino-containing organic compound having a molecular weight of from 60 to 600 daltons, or a mixture of such compounds.

7. The coating composition of claim 6, wherein component (b1) of the polyurethane resin HP' consists of up to 100% by weight, based on (b1), of alpha,omega-polymethacrylate diols.

8. The coating composition of claim 1 wherein the hydrophobic polymer resin HP' comprises less than 30% by weight of the hydrophilicized polymer resin HP, based on the hydrophilicized polymer resin HP.

9. The coating composition of claim 1 wherein the monomeric constituents (aa1), (aa2), (aa3) and (aa4) are employed in quantities of:

from 30 to 98% by weight of (aa1),
from 1 to 30% by weight of (aa2),
from 0 to 20% by weight of (aa3) and
from 1 to 20% by weight of (aa4), the sum of the monomers (aa1), (aa2), (aa3) and (aa4) making up 100% by weight.

10. A process of for finishing and/or a substrate, comprising providing the coating composition of claim 1, and
applying the coating composition to a substrate.

11. The process of claim 10 wherein the substrate is a previously coated automotive substrate.

12. The process of claim 10 wherein the substrate is selected from the group consisting of metal, plastic, and mixture thereof.

* * * * *